(12) United States Patent
Sohn et al.

(10) Patent No.: US 8,244,048 B2
(45) Date of Patent: Aug. 14, 2012

(54) METHOD AND APPARATUS FOR IMAGE ENCODING AND IMAGE DECODING

(75) Inventors: Yu-mi Sohn, Seongnam-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1232 days.

(21) Appl. No.: 11/965,104

(22) Filed: Dec. 27, 2007

(65) Prior Publication Data

US 2008/0232705 A1 Sep. 25, 2008

(30) Foreign Application Priority Data

Mar. 23, 2007 (KR) .................. 10-2007-0028886

(51) Int. Cl.
*G06K 9/36* (2006.01)
(52) U.S. Cl. ........................ 382/238; 382/236
(58) Field of Classification Search .......... 382/232–253; 375/240–241
See application file for complete search history.

(56) References Cited

U.S. PATENT DOCUMENTS

| | | | |
|---|---|---|---|
| 7,469,069 B2 * | 12/2008 | Kim et al. .................... | 382/236 |
| 8,014,026 B2 * | 9/2011 | Cho et al. ...................... | 358/1.9 |
| 8,126,053 B2 * | 2/2012 | Song ........................ | 375/240.12 |
| 2006/0146930 A1 | 7/2006 | Kim et al. | |
| 2006/0164544 A1 | 7/2006 | Lecomte et al. | |
| 2006/0233251 A1 | 10/2006 | Kim et al. | |
| 2006/0268990 A1 | 11/2006 | Lin et al. | |
| 2007/0019730 A1 | 1/2007 | Lee et al. | |
| 2007/0065026 A1 | 3/2007 | Lee et al. | |

FOREIGN PATENT DOCUMENTS

| | | |
|---|---|---|
| CN | 1933601 A | 3/2007 |
| EP | 1773071 A2 | 4/2007 |
| JP | 2005-198269 A | 7/2005 |

OTHER PUBLICATIONS

International Search Report dated Apr. 8, 2008.
Chinese Office Action issued in Application No. 2008-80009532.4, dated Feb. 24, 2011.
European Search Report issued in Application No. 08704690.0, dated Mar. 21, 2011.
Yung-lyul Lee, et al.; "Lossless INRA Coding for Improved 4:4:4 Coding in H.264/MPEG-4 AVC"; ITU Study Group 16—Video Coding Experts Group—ISO/IEC MPEG and ITU-T VCEG (ISO/IEC JTC1/SC29/WG11 and ITU-T SG16 Q6) JVT-P016, Jul. 19, 2005; XP030006058, 12pages.
Communication dated Mar. 28, 2012 issued by the Intellectual Property Office of P.R. China in counterpart Chinese Patent Application No. 200880009532.4.

* cited by examiner

*Primary Examiner* — Bhavesh Mehta
*Assistant Examiner* — Sean Motsinger
(74) *Attorney, Agent, or Firm* — Sughrue Mion, PLLC

(57) ABSTRACT

Provided are a method and apparatus for image encoding which improves encoding efficiency in accordance with image characteristics by performing prediction in lines and performing a one-dimensional transformation in lines on an input image, and a method and apparatus for image decoding. Encoding efficiency of an image may be improved by generating a prediction sub residual block using neighboring residues and performing a one-dimensional discrete cosine transformation (DCT) on a difference residual block which is a difference between an original sub residual block and the prediction sub residual block.

23 Claims, 13 Drawing Sheets

METHOD AND APPARATUS FOR IMAGE ENCODING AND IMAGE DECODING

CROSS-REFERENCE TO RELATED PATENT APPLICATION

This application claims priority from Korean Patent Application No. 10-2007-0028886, filed on Mar. 23, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to image encoding and image decoding, and more particularly, to image encoding which improves prediction efficiency and compression efficiency in accordance with image characteristics by performing prediction in lines and performing a one-dimensional transformation in lines on an input image.

2. Description of the Related Art

In general, according to video compression standards such as Moving Picture Experts Group (MPEG)-1, MPEG-2, MPEG-4 Visual, H.261, H.263 and H.264, image data is compressed by dividing an image frame into a plurality of image blocks, performing prediction on the image blocks and thereby obtaining prediction blocks, and transforming and quantizing differences between the original image blocks and the prediction blocks.

The prediction performed may be intra prediction or inter prediction. Intra prediction is performed on a current image block by using data of restored neighboring blocks, which is included in the current image block. Inter prediction is performed by generating a prediction block that corresponds to a current image block from one or more video frames previously encoded using a block-based motion compensation method. According to related art methods, generally, data of neighboring blocks used for intra prediction comprises pixels of neighboring previous blocks, which are adjacent to the top and left of the current image block. In this case, top and left pixels of the current image block, which are adjacent to pixels of previous blocks, have small differences between prediction values and original pixel values due to their close distances from the pixels of the previous blocks. However, pixels of the current image block, which are disposed far from the pixels of the previous blocks, may have large differences between prediction values and original pixel values.

Meanwhile, according to H.264 standards, two-dimensional discrete cosine transformation (DCT) is performed on residual data obtained by using inter prediction or intra prediction in 4×4 blocks. According to related art Joint Photographic Experts Group (JPEG), MPEG-1, MPEG-2, and MPEG-4 standards, two-dimensional DCT is performed on the residual data in 8×8 blocks. In the two-dimensional DCT, although horizontal or vertical correlations exist in the residual data, the correlations between data in a residual block may not be efficiently used.

Thus, a method of image encoding which improves compression efficiency by improving prediction efficiency is desired in order to cope with a restriction of a transmission bandwidth and provide an image having higher quality to a user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention provide a method and apparatus for image encoding which improves prediction efficiency and compression efficiency when an image is encoded, and a method and apparatus for image decoding.

According to an aspect of the present invention, there is provided a method of image encoding, including generating a plurality of sub residual blocks by dividing a residual block having a predetermined size; generating prediction sub residual blocks of the sub residual blocks by using residues of previously processed neighboring sub residual blocks; generating difference sub residual blocks by calculating differences between the prediction sub residual blocks and the sub residual blocks; and transforming the difference sub residual blocks.

According to another aspect of the present invention, there is provided an apparatus for image encoding, including a division unit which generates a plurality of sub residual blocks by dividing a residual block having a predetermined size; a residue prediction unit which generates prediction sub residual blocks of the sub residual blocks by using residues of previously processed neighboring sub residual blocks; a subtraction unit which generates difference sub residual blocks by calculating differences between the prediction sub residual blocks and the sub residual blocks; and a transformation unit which transforms the difference sub residual blocks.

According to another aspect of the present invention, there is provided a method of image decoding, including determining a division mode of a current residual block to be decoded by using information on a division mode of the residual block which is included in a received bitstream; generating prediction sub residual blocks of a plurality of sub residual blocks of the residual block by using residues of previously decoded neighboring sub residual blocks in accordance with the determined division mode; restoring difference residues that are differences between the prediction sub residual blocks and the sub residual blocks and are included in the bitstream; and restoring the sub residual blocks by adding the prediction sub residual blocks and the difference residues.

According to another aspect of the present invention, there is provided an apparatus for image decoding, including a residue prediction unit which generates prediction sub residual blocks of a plurality of sub residual blocks of a current residual block to be decoded by using residues of previously decoded neighboring sub residual blocks in accordance with a division mode of the residual block included in a received bitstream; a difference residue restoration unit which restores difference residues that are differences between the prediction sub residual blocks and the sub residual blocks and are included in the bitstream; and an addition unit which restores the sub residual blocks by adding the prediction sub residual blocks and the difference residues.

According to another aspect of the present invention, there is provided a method of image encoding, including dividing an input image into a plurality of image blocks and generating prediction values of pixels of each image block in horizontal or vertical lines; generating residues that are differences between original values and the prediction values of the pixels, in lines; and performing a one-dimensional discrete cosine transformation (DCT) on the residues in lines.

According to another aspect of the present invention, there is provided an apparatus for image encoding, including a prediction unit which divides an input image into a plurality of image blocks and generates prediction values of pixels of each image block in horizontal or vertical pixel lines; a subtraction unit which generates residues that are differences between original values and the prediction values of the pixels, in lines; and a transformation unit which performs one-dimensional discrete cosine transformation (DCT) on the residues in lines.

According to another aspect of the present invention, there is provided a method of image decoding, including restoring residues that are differences between prediction values and original values of horizontal or vertical pixel lines and are included in a received bitstream; predicting pixel values of each pixel line to be decoded by using pixel values of a previous pixel line decoded in a predetermined order; and decoding pixels of the pixel lines by adding the predicted pixel values of the pixel lines and the restored residues.

According to another aspect of the present invention, there is provided an apparatus for image decoding, including a prediction unit which predicts pixel values of horizontal or vertical pixel lines to be decoded by using previous pixel lines in vertical or horizontal lines in a predetermined order; a restoration unit which restores residues that are differences between prediction values of the pixel lines and original pixel values of the pixel lines and are included in a received bitstream; and an addition unit which decodes pixels of the pixel lines by adding the predicted pixel values of the pixel lines and the restored residues.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 1:
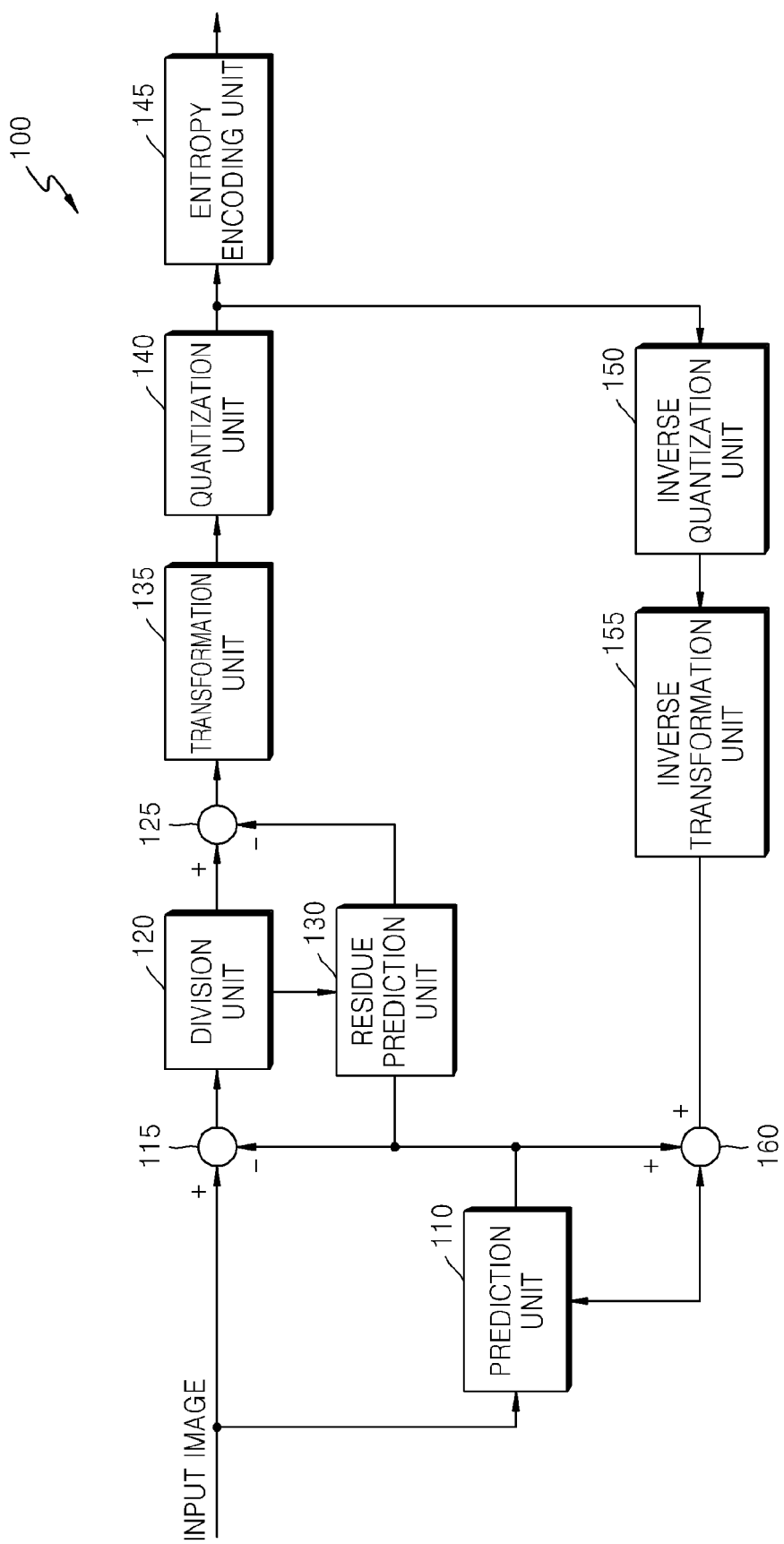
FIG. 1 is a block diagram illustrating an apparatus for image encoding, according to an embodiment of the present invention.

FIG. 1 is a block diagram illustrating an apparatus 100 for image encoding, according to an exemplary embodiment of the present invention.

The apparatus 100 divides a residual block, that is, a difference between an original image block and a prediction image block into a plurality of sub residual blocks, generates prediction sub residual blocks of the sub residual blocks by using neighboring residues, and transforms difference sub residual blocks that are differences between the original sub residual blocks and the prediction sub residual blocks.

Referring to FIG. 1, the apparatus 100 includes a prediction unit 110, a first subtraction unit 115, a division unit 120, a second subtraction unit 125, a residue prediction unit 130, a transformation unit 135, a quantization unit 140, an entropy encoding unit 145, an inverse quantization unit 150, an inverse transformation unit 155 and an addition unit 160.

The prediction unit 110 divides an input image into a plurality of sub blocks having a predetermined size and generates prediction blocks by performing inter or intra prediction on each of the sub blocks. The inter prediction is performed by using a reference picture that was previously encoded and then restored. The prediction unit 110 performs the inter prediction by performing motion prediction which generates motion vectors indicating regions similar to regions of a current block in a predetermined search range of the reference picture and by performing motion compensation which obtains data on corresponding regions of the reference picture which are indicated by the motion vectors, thereby generating a prediction block of the current block. Also, the prediction unit 110 performs the intra prediction which generates a prediction block by using data of neighboring blocks of the current block. The inter prediction and the intra prediction according to related art image compression standards such as H.264 may be used and a variety of modified prediction methods may also be used.

When the prediction block of the current block is generated by performing the inter prediction or the intra prediction, the first subtraction unit 115 calculates prediction errors by subtracting pixel values of the prediction block from original pixel values of the current block. Hereinafter, a prediction error between an original pixel value and a prediction pixel value is defined as a residue and a block composed of a plurality of residues is defined as a residual block.

The division unit 120 divides the residual block into a plurality of sub residual blocks. In more detail, assuming that the size of the residual block is N×N (where N is a positive number equal to or greater than 2), the residual block is divided into the sub residual blocks having the size of any one of N×1, 1×N, and a×a (where a is a natural number smaller than N).

Figure 2A:
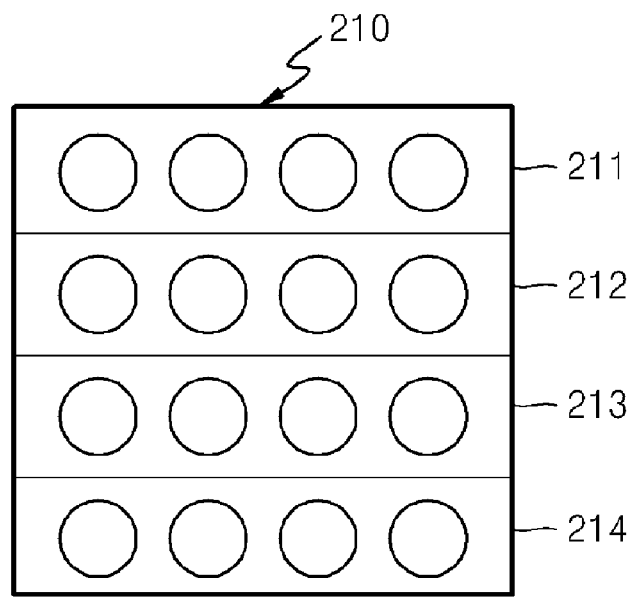
FIGS. 2A, 2B and 2C are diagrams illustrating examples of when a residual block is divided into a plurality of sub residual blocks, according to an exemplary embodiment of the present invention.
Figure 2B:
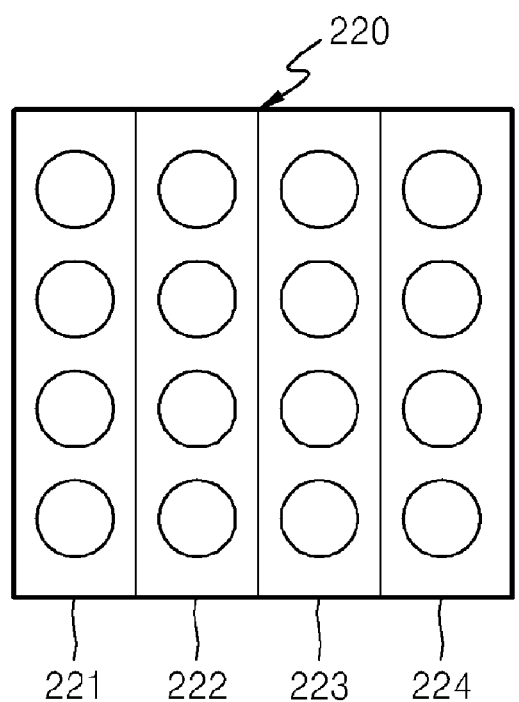
Figure 2C:
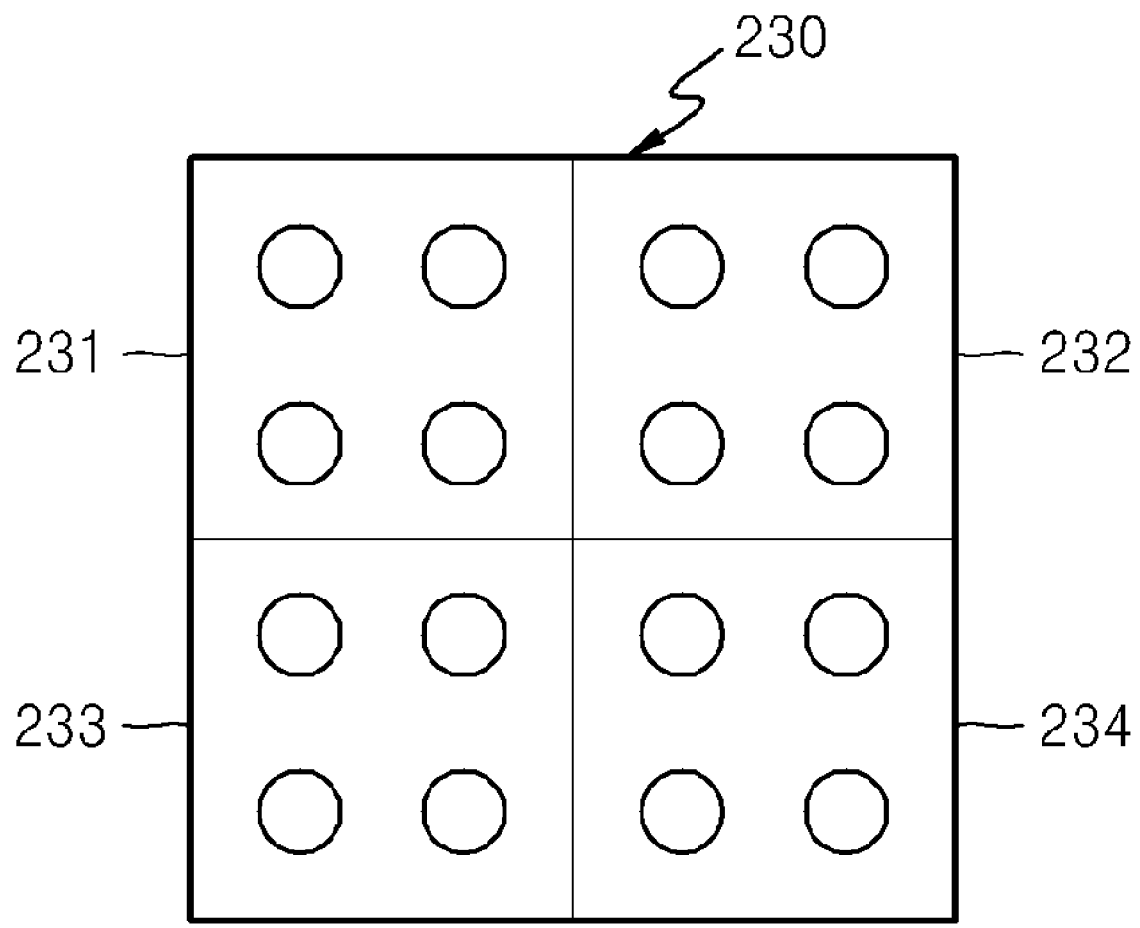

FIGS. 2A through 2B are diagrams illustrating examples of when a residual block is divided into a plurality of sub residual blocks, according to an exemplary embodiment of the present invention. FIG. 2A is a diagram illustrating an example of when a 4×4 residual block 210 is divided into a plurality of 1×4 sub residual blocks 211, 212, 213 and 214. FIG. 2B is a diagram illustrating an example of when a 4×4 residual block 220 is divided into a plurality of 4×1 sub residual blocks 221, 222, 223 and 224. FIG. 2C is a diagram illustrating an example of when a 4×4 residual block 230 is divided into a plurality of 2×2 sub residual blocks 231, 232, 233 and 234. Although only a 4×4 residual block is described as an example, the present invention is not limited thereto. The present invention may also be similarly applied to a variety of residual blocks such as an 8×8 residual block and a 16×16 residual block.

Referring back to FIG. 1, the residue prediction unit 130 generates prediction sub residual blocks of the sub residual blocks by predicting residues of the sub residual blocks of the residual block divided as illustrated in FIG. 2A, 2B or 2C by using residues of previously processed neighboring sub residual blocks.

Figure 3A:
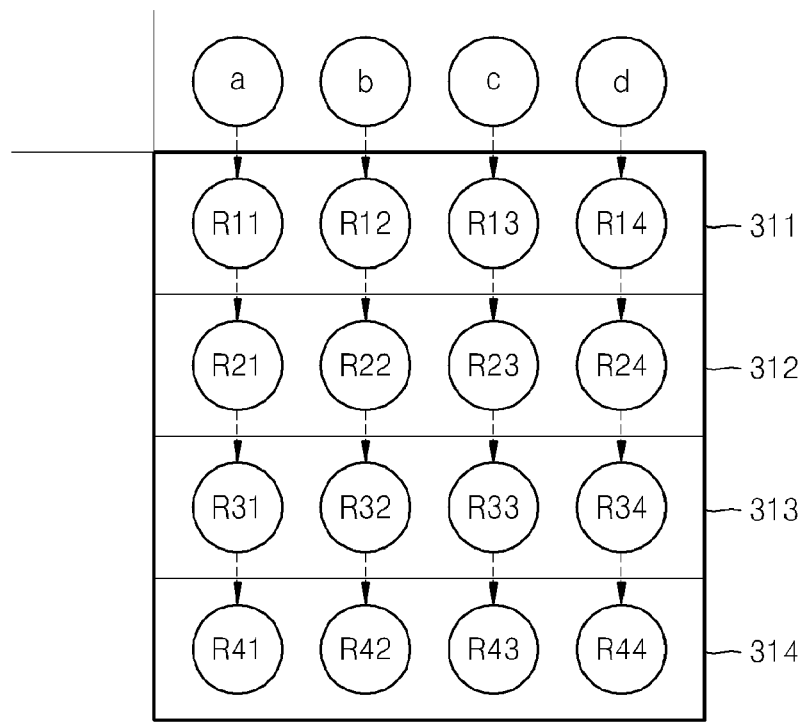
FIGS. 3A and 3B are diagrams for illustrating a method of generating prediction sub residual blocks, according to an exemplary embodiment of the present invention.
Figure 3B:
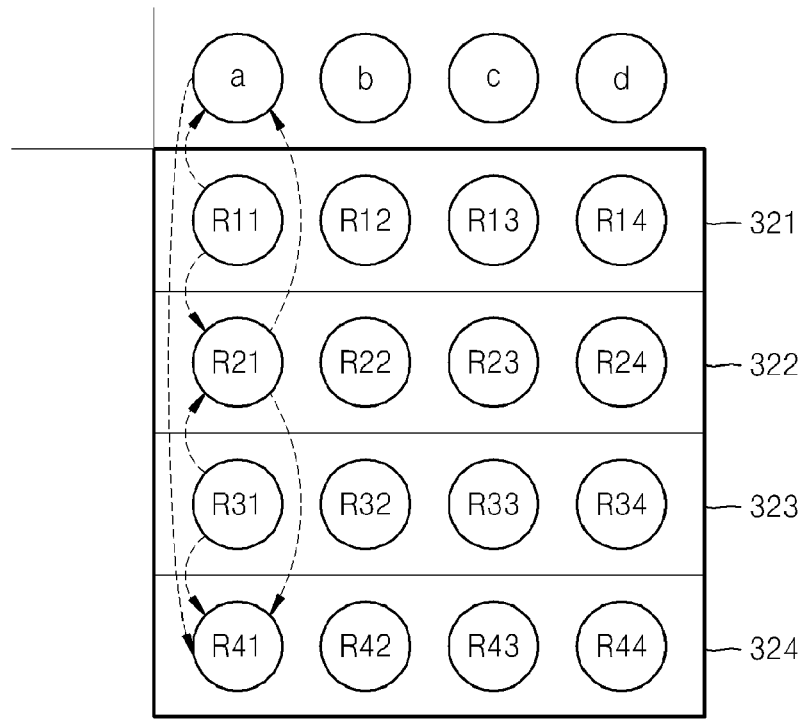

FIGS. 3A and 3B are diagrams for illustrating a method of generating prediction sub residual blocks, according to an exemplary embodiment of the present invention. In FIGS. 3A and 3B, Rxy represents a residue at a location (x,y)(x,y=1, 2, 3, 4). A method of generating prediction sub residual blocks by dividing a 4×4 residual block into a plurality of 1×4 sub residual blocks 311, 312, 313 and 314 or 321, 322, 323 and 324 will now be described with reference to FIGS. 3A and 3B.

Referring to FIG. 3A, the sub residual blocks 311, 312, 313 and 314 included in the 4×4 residual block are separately predicted by using residues of neighboring sub residual blocks previously processed in a predetermined order. The prediction may be performed in an orthogonal direction to a division direction of the sub residual blocks 311, 312, 313 and 314. For example, assuming that the sub residual blocks 311, 312, 313 and 314 divided in a horizontal direction are sequentially predicted in a downward direction, residues R11, R12, R13 and R14 of a first sub residual block 311 may be predicted by extending residues a, b, c and d of a previous residual block encoded prior to the current residual block in a vertical direction. That is, assuming that residues R11, R12, R13 and R14 of the first sub residual block 311 have prediction residues PR11, PR12, PR13 and PR14, respectively, PR11=a, PR12=b, PR13=c and PR14=d.

Also, assuming that residues R21, R22, R23 and R24 of a second sub residual block 312 have prediction residues PR21, PR22, PR23 and PR24, respectively, prediction residues PR21, PR22, PR23 and PR24 of the second sub residual block 312 may be predicted by extending previously processed residues R11, R12, R13 and R14 of the first sub residual block 311 in a vertical direction. Likewise, prediction residues PR31, PR32, PR33 and PR34 of residues R31, R32, R33 and R34 of a third sub residual block 313 and prediction residues PR41, PR42, PR43 and PR44 of residues R41, R42, R43 and R44 of a fourth sub residual block 314 may be predicted by extending original or restored residues R21, R22, R23 and R24 of the second sub residual block 312 and original or restored residues R31, R32, R33 and R34 of the third sub residual block 313, respectively. In this case, when each sub residual block is predicted by using residues of a previous sub residual block which are differences between an original image and a prediction image or by using residues of a neighboring sub residual block restored by performing a one-dimensional discrete cosine transformation (DCT), quantization, inverse quantization, and one-dimensional inverse discrete cosine transformation (IDCT) on a difference sub residual block and by adding the difference sub residual block to a prediction sub residual block.

In FIG. 3A, the sub residual blocks divided in a horizontal direction are sequentially predicted in a downward direction. However, a prediction order of the sub residual blocks may be changed as illustrated in FIG. 3B.

Referring to FIG. 3B, a fourth sub residual block 324 is predicted first, then a second sub residual block 322 is predicted, then a first sub residual block 321 is predicted, and then a third sub residual block 323 is predicted. In more detail, residues R41, R42, R43 and R44 of the fourth sub residual block 324 are predicted by extending residues a, b, c and d of a previous residual block, then residues R21, R22, R23 and R24 of the second sub residual block 322 are predicted by calculating average values of corresponding residues, each respectively from among the residues a, b, c and d of the previous residual block and from among residues R41, R42, R43 and R44 of the fourth sub residual block 324. Also, residues R11, R12, R13 and R14 of the first sub residual block 321 are predicted by calculating average values of corresponding residues, each respectively from among the residues a, b, c and d of the previous residual block and from among residues R21, R22, R23 and R24 of the second sub residual block 322, and residues R31, R32, R33 and R34 of the third sub residual block 323 are predicted by calculating average values of corresponding residues, each respectively from among residues R21, R22, R23 and R24 of the second sub residual block 322 and from among residues R41, R42, R43 and R44 of the fourth sub residual block 324. For example, assuming that PRxy is a prediction residue of a residue Rxy, PR41=a, PR21=(a+R41)/2, PR11=(a+R21)/2, and PR31=(R21+R41)/2.

The above described method of generating prediction sub residual blocks of sub residual blocks divided in a horizontal direction may also be similarly applied to sub residual blocks divided in a vertical direction as illustrated in FIG. 2B.

Figure 4:
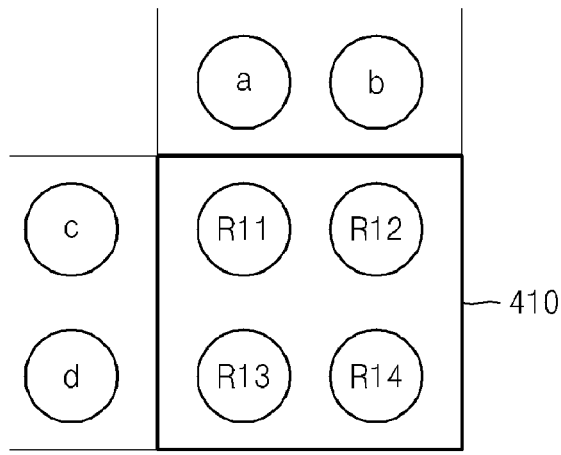
FIG. 4 is a diagram for illustrating a method of generating prediction sub residual blocks, according to another exemplary embodiment of the present invention.

FIG. 4 is a diagram for illustrating a method of generating prediction sub residual blocks, according to another exemplary embodiment of the present invention.

When a residual block is divided into a plurality of sub residual blocks having the one width as the residual block illustrated in FIG. 3A or FIG. 3B, residues of a current sub residual block is predicted by performing prediction in lines using residues of a previous sub residual block disposed in a orthogonal direction of a division direction of the sub residual blocks. However, referring FIG. 4, when a 4×4 residual block is divided into a plurality of 2×2 sub residual blocks, prediction residues may be generated by extending neighboring pixels of a previous sub residual block at least in one of a horizontal direction and a vertical direction. For example, assuming that a residue Rxy at a location (x,y) of a 2×2 sub residual block 410 has a prediction residue PRxy, if upper neighboring previous residues a and b are extended in a vertical direction, PR11=a, PR13=a, PR12=b, and PR14=b or if left neighboring previous residues c and d are extended in a horizontal direction, PR11=c, PR12=c, PR13=d, and PR14=d. Alternatively, a prediction residue of a current sub residual block to be predicted may be calculated as an average residue of previous residues at the same horizontal and vertical line from the upper and left neighboring previous residues. For example, PR11=(a+c)/2, PR12=(b+c)/2, PR13=(a+d)/2, and PR14=(b+d)/2.

Referring back to FIG. 1, the second subtraction unit 125 generates difference sub residual blocks by calculating differences between the prediction sub residual blocks generated by the residue prediction unit 130 and the original sub residual blocks.

The transformation unit 135 performs DCT on the difference sub residual blocks. In particular, the transformation unit 135 performs one-dimensional DCT on the N×1 or 1×N sub residual blocks. For example, the transformation unit 135 performs one-dimensional horizontal DCT on the difference sub residual blocks which are divided in a horizontal direction as illustrated in FIG. 2A and then are predicted and performs one-dimensional vertical DCT on the difference sub residual blocks which are divided in a vertical direction as illustrated in FIG. 2B and then are predicted.

The quantization unit 140 performs quantization and the entropy encoding unit 145 performs variable length encoding on difference residues of the transformed difference sub residual blocks so that a bitstream is generated.

The difference residues quantized by the quantization unit 140 are inverse quantized by the inverse quantization unit 150 and inverse transformed by the inverse transformation unit 155 so that the difference sub residual blocks are restored.

The addition unit 160 restores the sub residual blocks by adding difference residues of the restored difference sub residual blocks and prediction residues of the prediction sub residual blocks which are generated by the reside prediction unit 130. The restored sub residual blocks are used when prediction sub residual blocks of next sub residual blocks are generated.

Also, the apparatus 100 may further include a division mode determination unit (not shown) which compares costs of bitstreams generated by using a plurality of sub residual blocks having different sizes, and selects sub residual blocks having the smallest cost so as to use the sub residual block to divide a current residual block.

The division mode determination unit determines a division mode of a residual block by dividing the residual block into a plurality of sub residual blocks having different sizes, generating prediction sub residual blocks of the sub residual blocks by using residues of a previous sub residual block, and comparing costs of bitstreams generated by transforming, quantizing and entropy encoding difference sub residual blocks. For example, the division mode determination unit divides an N×N residual block into a plurality of 1×N sub residual blocks in division mode 1, into a plurality of N×1 sub residual blocks in division mode 2, or into a plurality of a×a sub residual blocks in division mode 3, compares rate distortion (RD) costs of bitstreams generated by transforming, quantizing, and entropy encoding the difference sub residual blocks generated in accordance with each division mode, and determines the division mode having the smallest RD cost as a final division mode.

The division mode determination unit may also determine whether to perform transformation of the residual block or not by comparing costs of bitstreams generated by encoding difference residual blocks of a plurality of sub residual blocks having different sizes and costs of bitstreams generated by bypassing transformation of a residual block and quantizing and entropy encoding the residual block.

Figure 5:
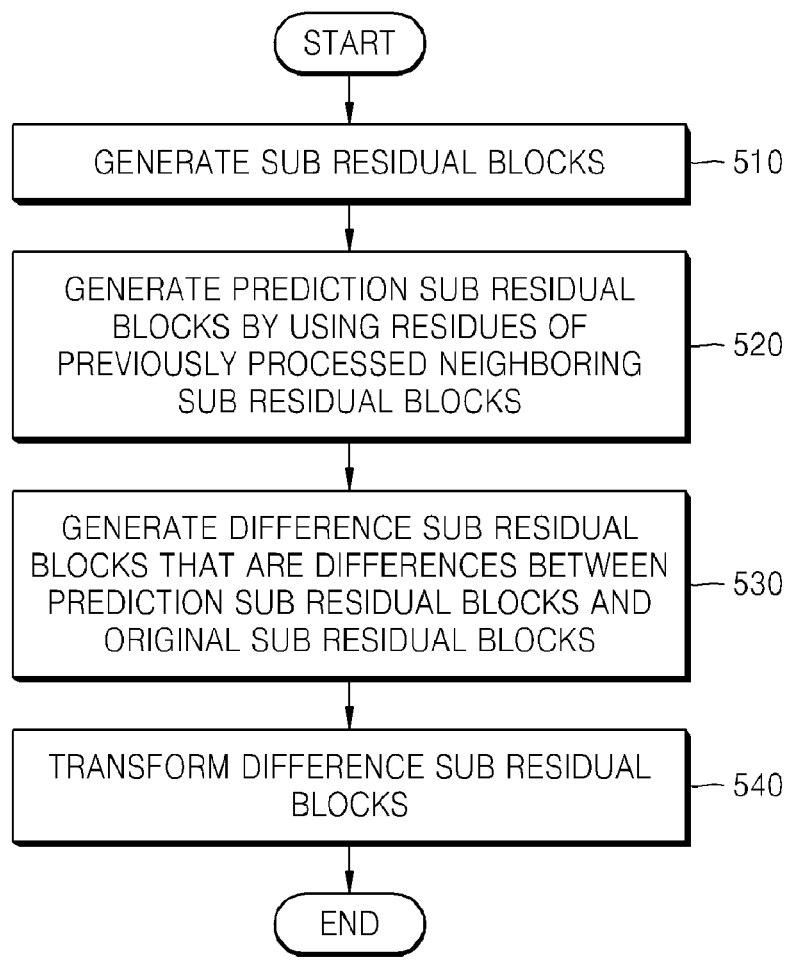
FIG. 5 is a flowchart illustrating a method of image encoding, according to an exemplary embodiment of the present invention.

FIG. 5 is a flowchart illustrating a method of image encoding, according to an exemplary embodiment of the present invention.

Referring to FIG. 5, in operation 510, a residual block generated by subtracting pixel values of a prediction block from original pixel values of a current block is divided into a plurality of sub residual blocks.

In operation 520, prediction sub residual blocks are generated by predicting residues of the current sub residual blocks using residues of previously processed sub residual blocks. As described above, the prediction sub residual blocks are predicted by extending the residues of the previous sub residual blocks at least in one of a horizontal direction and a vertical direction in accordance with a division type of the sub residual blocks.

In operation 530, difference sub residual blocks are generated by calculating differences between the prediction sub residual blocks and the original sub residual blocks.

In operation 540, DCT is performed on the difference sub residual blocks in accordance with the division type. As described above, one-dimensional DCT is performed on N×1 or 1×N difference sub residual blocks. The transformed difference sub residual blocks are quantized and entropy encoded and thus a bitstream is output. Also, the sub residual blocks are restored by inverse quantizing and inverse transforming the quantized difference sub residual blocks and adding the processed difference sub residual blocks to the prediction sub residual blocks. The restored sub residual blocks are used when residues of next sub residual blocks are predicted.

In a method and apparatus for image encoding according to the above exemplary embodiments described with reference to FIGS. 1 through 6, if horizontal or vertical correlations exist in a residual block, the magnitude of data generated by performing DCT in order to be encoded is reduced and thus compression efficiency is improved. For example, assuming that a 4×4 residual block includes residues having vertical correlations as shown in a matrix as shown $$\begin{pmatrix} 0 & 10 & 0 & 0 \\ 0 & 10 & 0 & 0 \\ 0 & 10 & 0 & 0 \\ 0 & 10 & 0 & 0 \end{pmatrix},$$

if two-dimensional DCT is applied, the matrix is transformed to $$\begin{pmatrix} 10 & 5.4120 & -10 & -13.0656 \\ 0 & 0 & 0 & 0 \\ 0 & 0 & 0 & 0 \\ 0 & 0 & 0 & 0 \end{pmatrix},$$

However, if one-dimensional vertical DCT is applied, the matrix is transformed to $$\begin{pmatrix} 0 & 20 & 0 & 0 \\ 0 & 0 & 0 & 0 \\ 0 & 0 & 0 & 0 \\ 0 & 0 & 0 & 0 \end{pmatrix}.$$

As a result, if one-dimensional DCT is performed on a residual block divided in a horizontal or vertical direction according to an exemplary embodiment of the present invention, the magnitude of transformation coefficients generated is reduced in accordance with image characteristics so that compression efficiency is improved.

Figure 6:
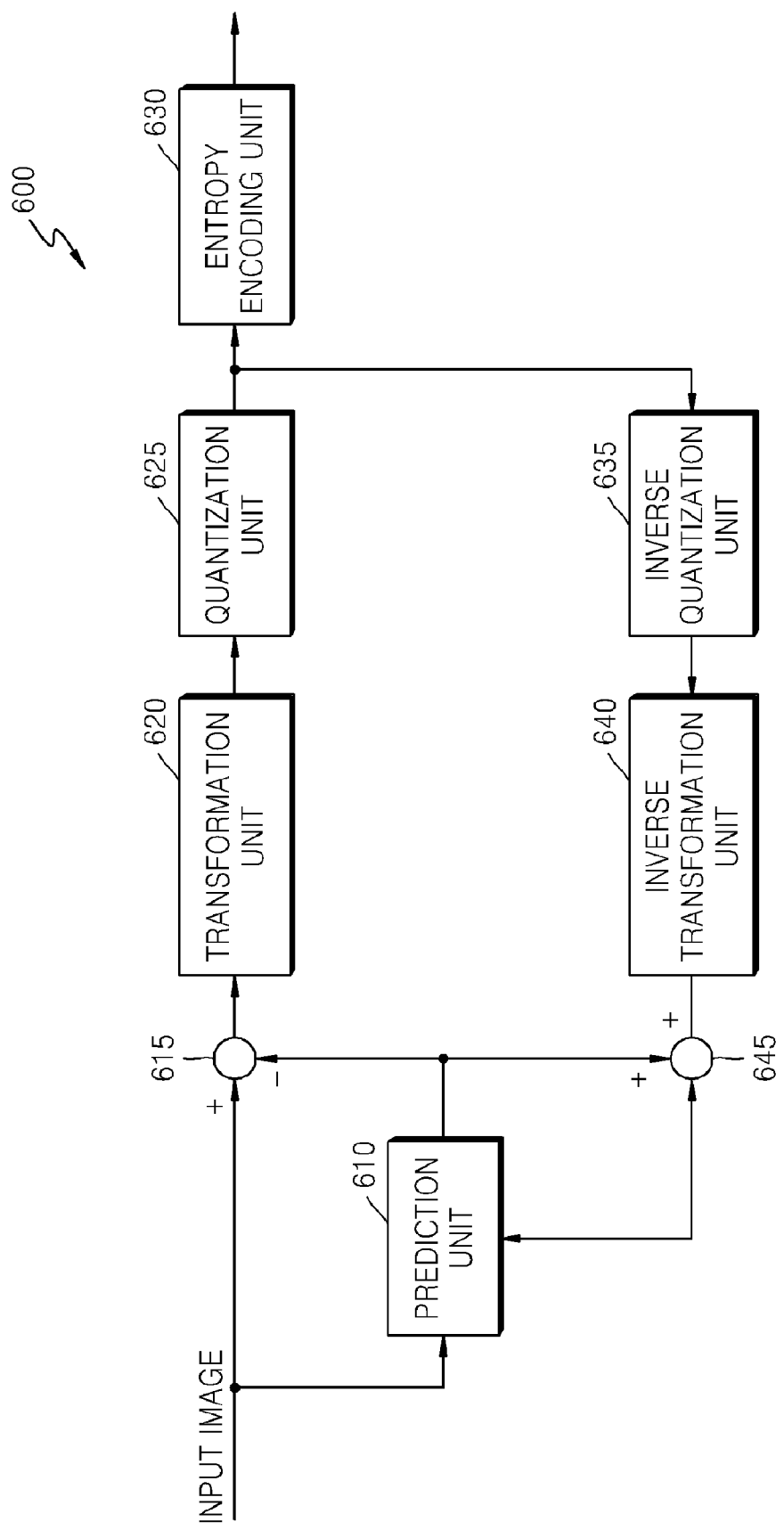
FIG. 6 is a block diagram illustrating an apparatus for image encoding, according to another exemplary embodiment of the present invention.

FIG. 6 is a block diagram illustrating an apparatus 600 for image encoding, according to another exemplary embodiment of the present invention.

The apparatus 100 illustrated in FIG. 1 according to the previous exemplary embodiment of the present invention divides a residual block into a plurality of sub residual blocks, generates prediction sub residual blocks of the sub residual blocks, and transforms difference sub residual blocks that are differences between the original sub residual blocks and the prediction sub residual blocks. However, the apparatus 600 according to the current exemplary embodiment generates prediction values of an input image block, not a residual block, in lines and one-dimensional DCT is performed on the prediction values.

Referring to FIG. 6, the apparatus 600 includes a prediction unit 610, a subtraction unit 615, a transformation unit 620, a quantization unit 625, an entropy encoding unit 630, an inverse quantization unit 635, an inverse transformation unit 640 and an addition unit 645.

The prediction unit 610 divides an input image into a plurality of image blocks and predicts pixel values of each image block in horizontal or vertical pixel lines. The prediction unit 610 predicts the pixel values in horizontal or vertical pixel lines in the same manner as the residue prediction unit 130 of the apparatus 100 illustrated in FIG. 1 which predicts residues of current 1×N or N×1 sub residual blocks divided from a residual block by using residues of a neighboring sub residual block.

Figure 7:
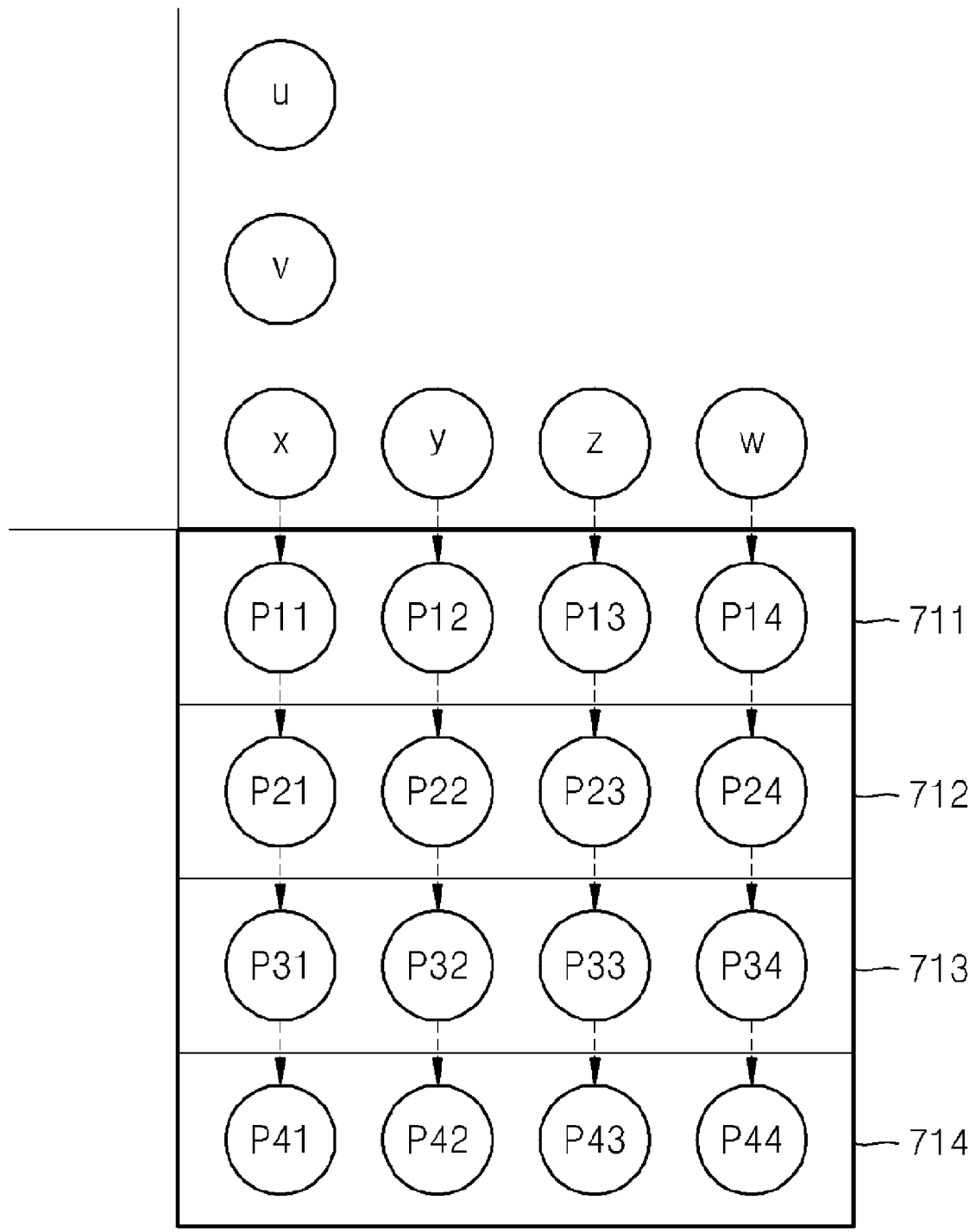
FIG. 7 is a diagram for illustrating a method of predicting pixel values in lines by a prediction unit illustrated in FIG. 6.

FIG. 7 is a diagram for illustrating a method of predicting pixel values in lines by the prediction unit 610 illustrated in FIG. 6. In FIG. 7, Pab represents a pixel value at a location (a,b) (a,b=1, 2, 3, 4) of an input image block and x, y, z, w, u and v represent pixel values of a neighboring block. Although only a 4×4 input image block that is divided into a plurality of horizontal pixel lines is illustrated in FIG. 7 as an example, the present invention is not limited thereto. An exemplary embodiment of the present invention may also be applied to input image blocks having different sizes and an input image block divided into a plurality of vertical pixel lines.

Referring to FIG. 7, assuming that the pixel values of the current block are sequentially predicted in horizontal pixel lines in a downward direction, pixel values P11, P12, P13 and P14 of a first horizontal line 711 may be predicted by extending pixel values x, y, z and w of the neighboring block in an orthogonal direction of a direction of the horizontal pixel lines. Assuming that a prediction pixel value of a pixel value Pab at a location (a,b) (a,b=1, 2, 3, 4) is PPab, PP11=x, PP12=y, PP13=z, and PP14=w. Also, pixel values P21, P22, P23 and P24 of a second horizontal line 712 may be predicted by extending pixel values P11, P12, P13 and P14 of the first horizontal line 711 in an orthogonal direction of the direction of the horizontal pixel lines. Likewise, pixel values P31, P32, P33 and P34 of a third horizontal line 713 and pixel values P41, P42, P43 and P44 of a fourth horizontal line 714 may be respectively predicted by extending pixel values P21, P22, P23 and P24 of the second horizontal line 712 and pixel values P31, P32, P33 and P34 of the third horizontal line 713 in an orthogonal direction of the direction of the horizontal pixel lines. Here, the original pixel values or pixel values restored by being transformed, quantized, inverse quantized and inverse transformed may be used as pixel values of a previous horizontal pixel line in order to predict pixel values of a current horizontal pixel line.

A method of sequentially predicting pixel values of an image block in horizontal pixel lines in a downward direction is described in FIG. 7. However, a prediction order of the horizontal pixel lines may be changed as shown by the prediction order of the sub residual blocks 321, 322, 323 and 324 illustrated in FIG. 3B. Furthermore, the pixel values of the image block may be predicted in vertical pixel lines.

Referring back to FIG. 6, since the prediction unit 610 generates prediction values of pixel values of a current block in lines by using pixel values of a neighboring block, a problem of related art block-based prediction, in which prediction efficiency of pixels disposed relatively far from the neighboring block than the other pixels is reduced, may be improved.

Meanwhile, the prediction unit 610 may predict each pixel value of the input image block by using a half-pel interpolation filter.

Figure 8:
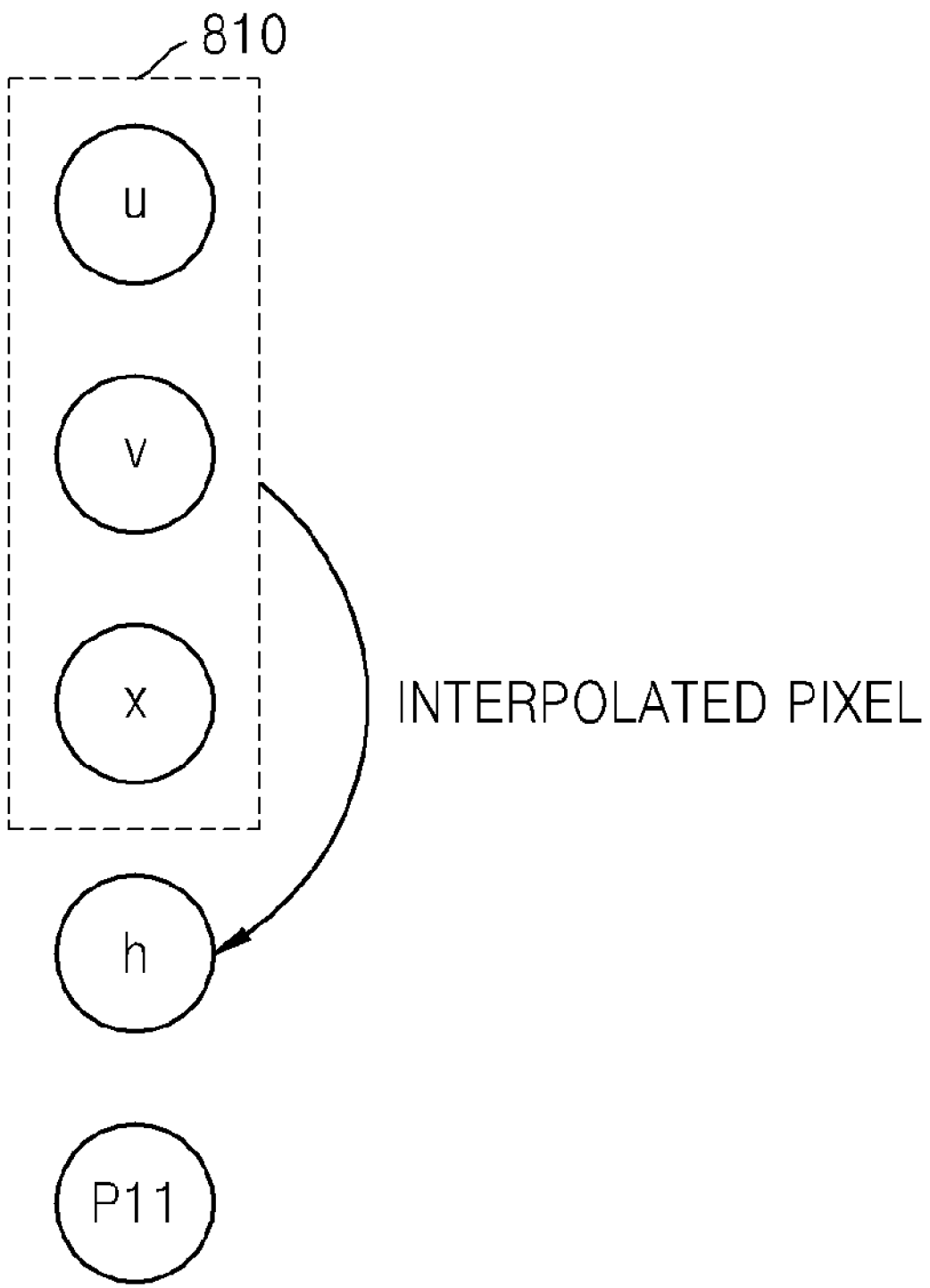
FIG. 8 is a diagram for illustrating a method of predicting pixel values, according to another exemplary embodiment of the present invention.

FIG. 8 is a diagram for illustrating a method of predicting pixel values, according to another exemplary embodiment of the present invention. FIG. 8 illustrates pixel value P11 illustrated in FIG. 7 and previous pixel values u, v and x, which are disposed in a vertical direction of pixel value P11.

Referring to FIGS. 7 and 8, when pixel value P11 is predicted, an interpolation value h is generated at a half-pel location by using the previous pixel values u, v and x and a prediction value of pixel value P11 may be generated by using the interpolation value h and the closest neighboring pixel value x. First, the interpolation value h may be interpolated by a 3-tap filter as shown in Equation 1 using the previous pixel values u, v and x.

$$h=(w1 \cdot x+w2 \cdot v+w3 \cdot u+w4)>>4 \qquad 1),$$

where w1, w2 and w3 represent weights given in accordance with relative distances between the interpolation value h and the previous pixel values u, v and x, w4 represents a predetermined offset value, and an operator ">>" represents a shift operation.

For example, w1=20, w2=−5, w3=1, and w4=8.

When the interpolation value h at the half-pel location between pixel value P11 to be predicted and the previous neighboring pixel value x is interpolated, pixel value P11 may be predicted by using the interpolation value h and the previous neighboring pixel value x as shown in Equation 2.

$$P11=x+(h-x)\times 2=2h-x \qquad 2)$$

Likewise, each pixel value of the current block may be predicted by generating half-pel interpolation values at half-pel locations and by using the half-pel interpolation values and the previous pixel values which is the closest to the current pixel to be predicted.

Referring back to FIG. 6, the subtraction unit 615 generates residues that are differences between the prediction values and the original pixel values in lines.

The transformation unit 620 performs one-dimensional DCT on the residues in lines. If the prediction unit 610 has predicted the pixel values in horizontal lines, the transformation unit 620 generates transformation coefficients by performing a one-dimensional horizontal DCT. If the prediction unit 610 has predicted the pixel values in vertical lines, the transformation unit 620 generates transformation coefficients by performing a one-dimensional vertical DCT. Meanwhile, although the prediction unit 610 has generated the prediction values in lines, the transformation unit 620 may alternatively perform two-dimensional DCT in blocks after the prediction of all pixels included in the image block is completed.

The quantization unit 625 quantizes the transformation coefficients in lines and the entropy encoding unit 630 performs variable-length encoding on the quantized transformation coefficients so that a bitstream is generated.

The quantized transformation coefficients are inverse quantized by the inverse quantization unit 635 and inverse transformed by the inverse transformation unit 640 so that the residues are restored.

The addition unit 645 restores the pixel values in lines by adding the restored residues and the prediction pixel values generated by the prediction unit 610. As described above, when two-dimensional DCT has been performed, the pixel values may be restored in blocks. The restored pixel values in lines are used when next pixel values in lines are predicted.

Figure 9:
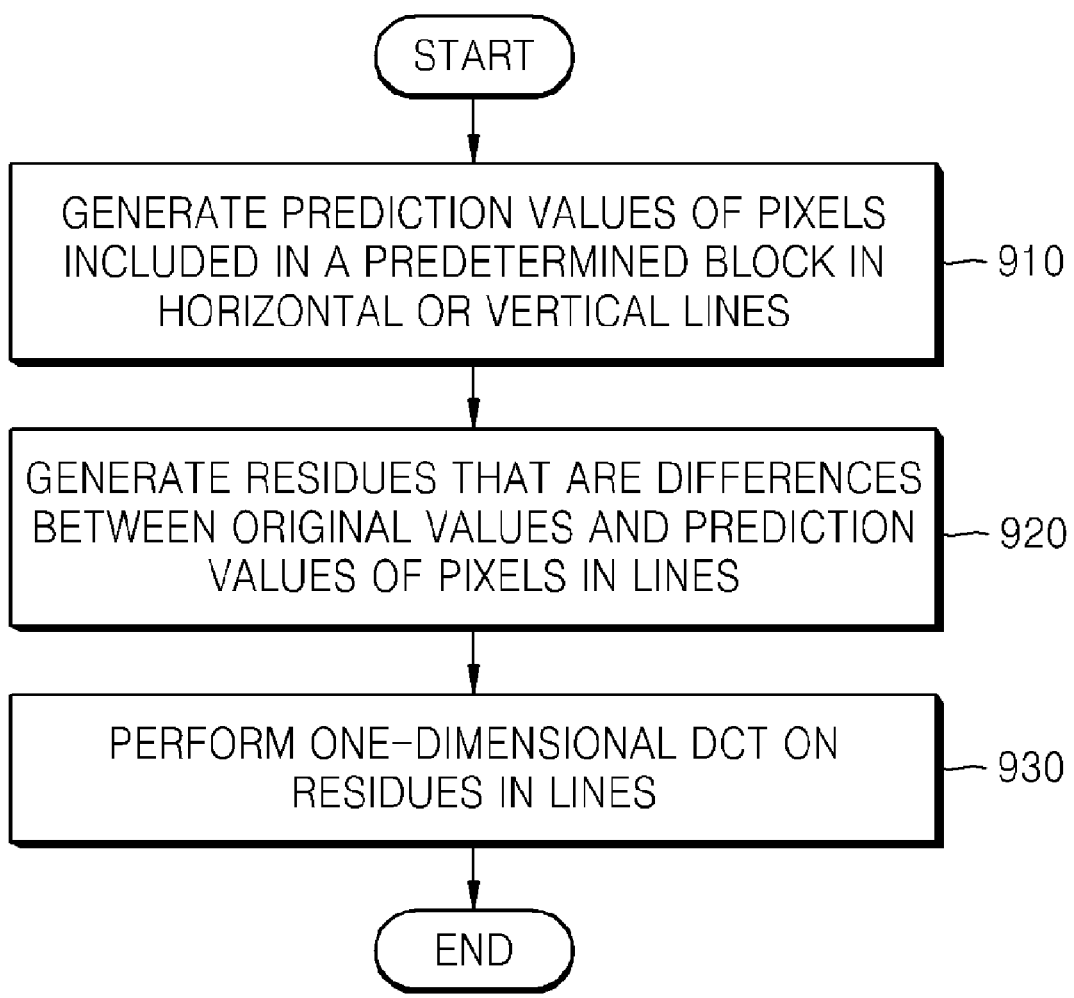
FIG. 9 is a flowchart illustrating a method of image encoding, according to another exemplary embodiment of the present invention.

FIG. 9 is a flowchart illustrating a method of image encoding, according to another exemplary embodiment of the present invention.

Referring to FIG. 9, in operation 910, an input image is divided into a plurality of image blocks and prediction values of pixels of each image block are generated in horizontal or vertical lines.

In operation 920, residues that are differences between the prediction values and original values of the pixels in lines, are generated.

In operation 930, transformation coefficients are generated by performing a one-dimensional DCT on the residues generated in lines. A bitstream is generated by quantizing and entropy encoding the transformation coefficients in lines. As described above, although the prediction is performed in lines, the transformation may be performed in blocks as in a related art method.

In a method and apparatus for image encoding according to the above exemplary embodiments described with reference to FIGS. 7 through 9, prediction values are generated in lines so that a distance between a current pixel and a reference pixel used for prediction is reduced. Accordingly, accuracy of the prediction increases and thus a bit rate may be reduced.

Figure 10:
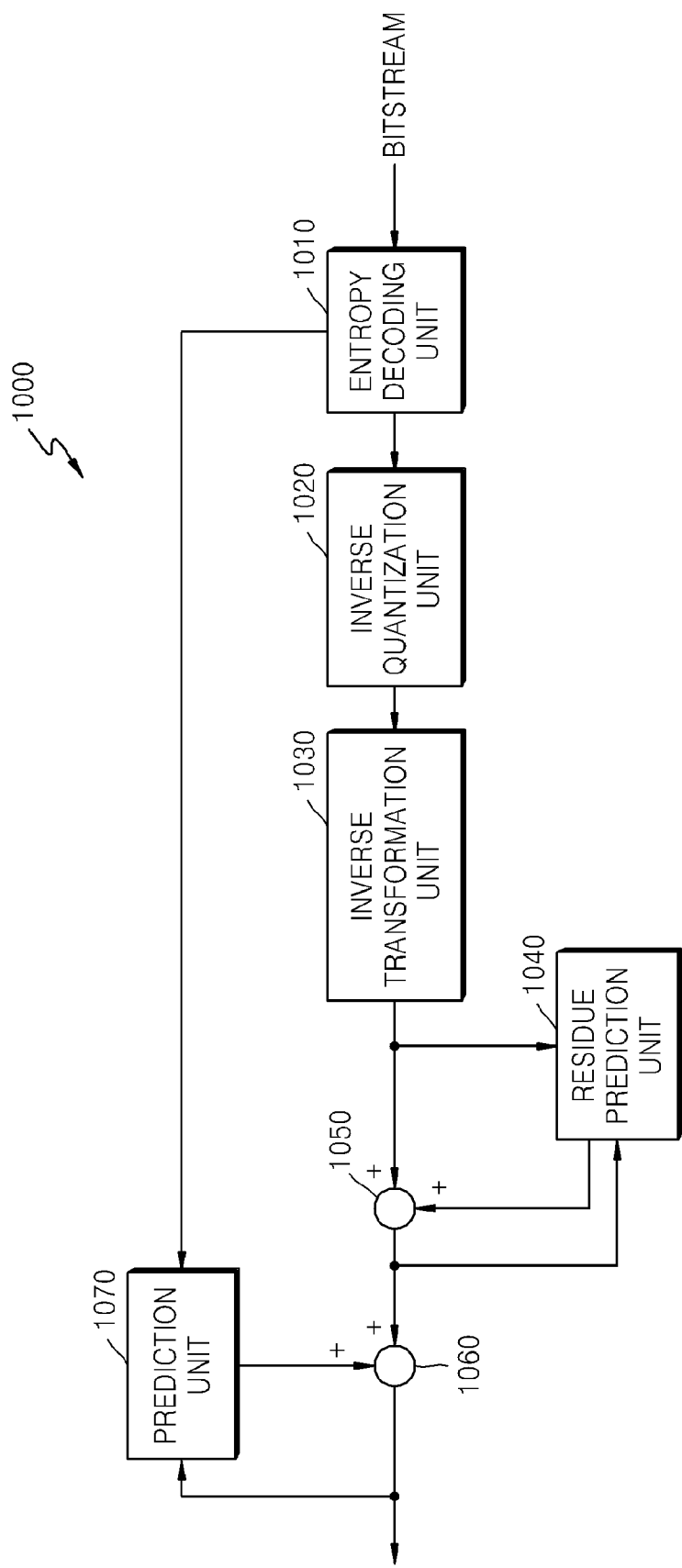
FIG. 10 is a block diagram illustrating an apparatus for image decoding, according to an exemplary embodiment of the present invention.

FIG. 10 is a block diagram illustrating an apparatus 1000 for image decoding, according to an exemplary embodiment of the present invention. The apparatus 1000 for image decoding corresponds to the apparatus 100 for image encoding illustrated in FIG. 1.

Referring to FIG. 10, the apparatus 1000 includes an entropy decoding unit 1010, an inverse quantization unit 1020, an inverse transformation unit 1030, a residue prediction unit 1040, a first addition unit 1050, a second addition unit 1060 and a prediction unit 1070.

The entropy decoding unit 1010 receives and entropy decodes a compressed bitstream so that information on a division mode of a current residual block which is included in the bitstream is extracted. The entropy decoding unit 1010 also entropy decodes difference residues included in the bitstream, the inverse quantization unit 1020 inverse quantizes the entropy decoded difference residues, and the inverse transformation unit 1030 restores the difference residues by inverse transforming the inverse quantized difference residues. In particular, the inverse transformation unit 1030 performs one-dimensional inverse DCT if the current residual block is encoded in N×1 or 1×N sub residual blocks.

The residue prediction unit 1040 divides the current residual block into a plurality of sub residual blocks in accordance with the extracted information on the division mode of the current residual block to be decoded and generates prediction sub residual blocks of the current sub residual blocks by using residues of previously decoded neighboring sub residual blocks. The residue prediction unit 1040 generates the prediction sub residual blocks of the current sub residual blocks in the same manner as the residue prediction unit 130 illustrated in FIG. 1.

The first addition unit 1050 restores the sub residual blocks by adding difference sub residual blocks of the current sub residual blocks which are composed of the difference residues output by the inverse transformation unit 1030 and the prediction sub residual blocks.

The prediction unit 1070 generates a prediction block by performing inter prediction or intra prediction in accordance with a prediction mode of the current block.

The second addition unit 1060 restores the current block by adding the prediction block generated by the prediction unit 1070 and the sub residual blocks restored by the first addition unit 1050.

Figure 11:
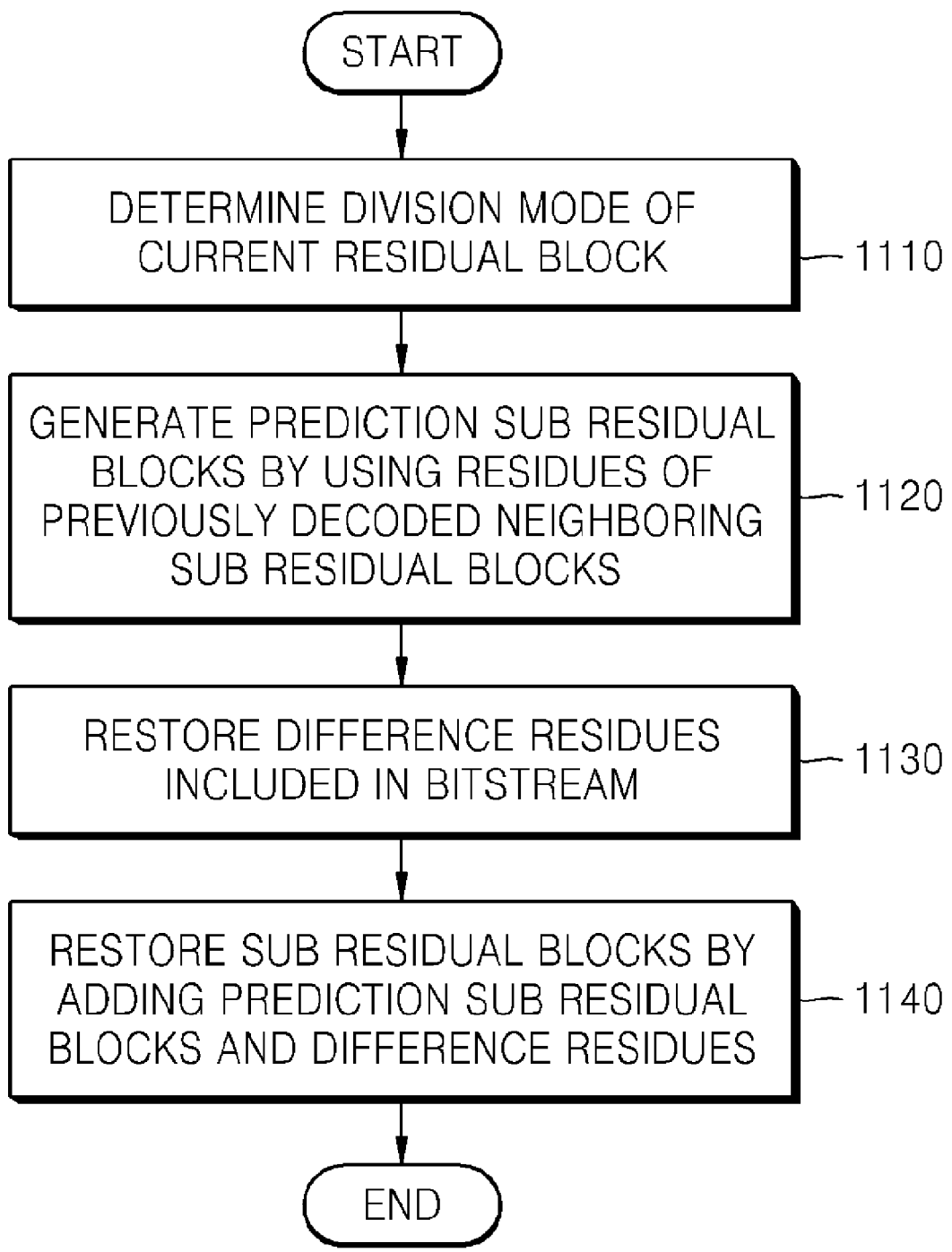
FIG. 11 is a flowchart illustrating a method of image decoding, according to an exemplary embodiment of the present invention.

FIG. 11 is a flowchart illustrating a method of image decoding, according to an exemplary embodiment of the present invention.

Referring to FIG. 11, in operation 1110, a division mode of a current residual block to be decoded is determined by using information on a division mode of the residual block which is included in a received bitstream.

In operation 1120, prediction sub residual blocks of a plurality of sub residual blocks of the residual block are generated by using residues of neighboring sub residual blocks previously decoded in accordance with the determined division mode.

In operation 1130, difference sub residual blocks that are differences between the prediction sub residual blocks and the sub residual blocks and that are included in the bitstream, are restored.

In operation 1140, the sub residual blocks are restored by adding the prediction sub residual blocks and the difference sub residual blocks. An image is restored by adding the restored sub residual blocks and a prediction block generated by performing inter or intra prediction.

Figure 12:
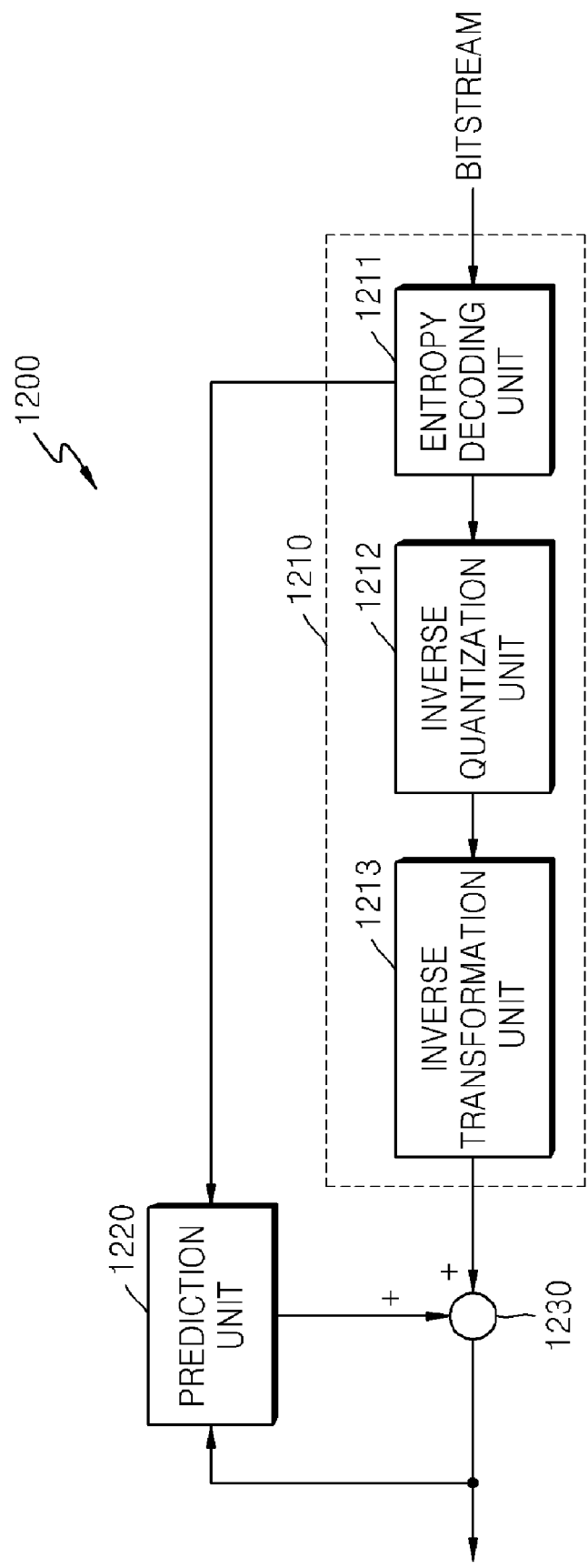
FIG. 12 is a block diagram illustrating an apparatus for image decoding, according to another exemplary embodiment of the present invention.

FIG. 12 is a block diagram illustrating an apparatus 1200 for image decoding, according to another exemplary embodiment of the present invention.

Referring to FIG. 12, the apparatus 1200 includes a restoration unit 1210, a prediction unit 1220 and an addition unit 1230. The restoration unit 1210 restores residues that are differences between prediction values and original values of pixel lines and are included in a received bitstream, and includes an entropy decoding unit 1211, an inverse quantization unit 1212 and an inverse transformation unit 1213.

The prediction unit 1220 predicts pixel values of a horizontal or vertical current pixel line to be decoded in a predetermined order by using a corresponding previously decoded pixel line.

The addition unit 1230 decodes the current pixel line by adding the prediction values of the current pixel line and the restored residues. By repeating the above-described procedure, all pixels included in an image block may be decoded.

Figure 13:
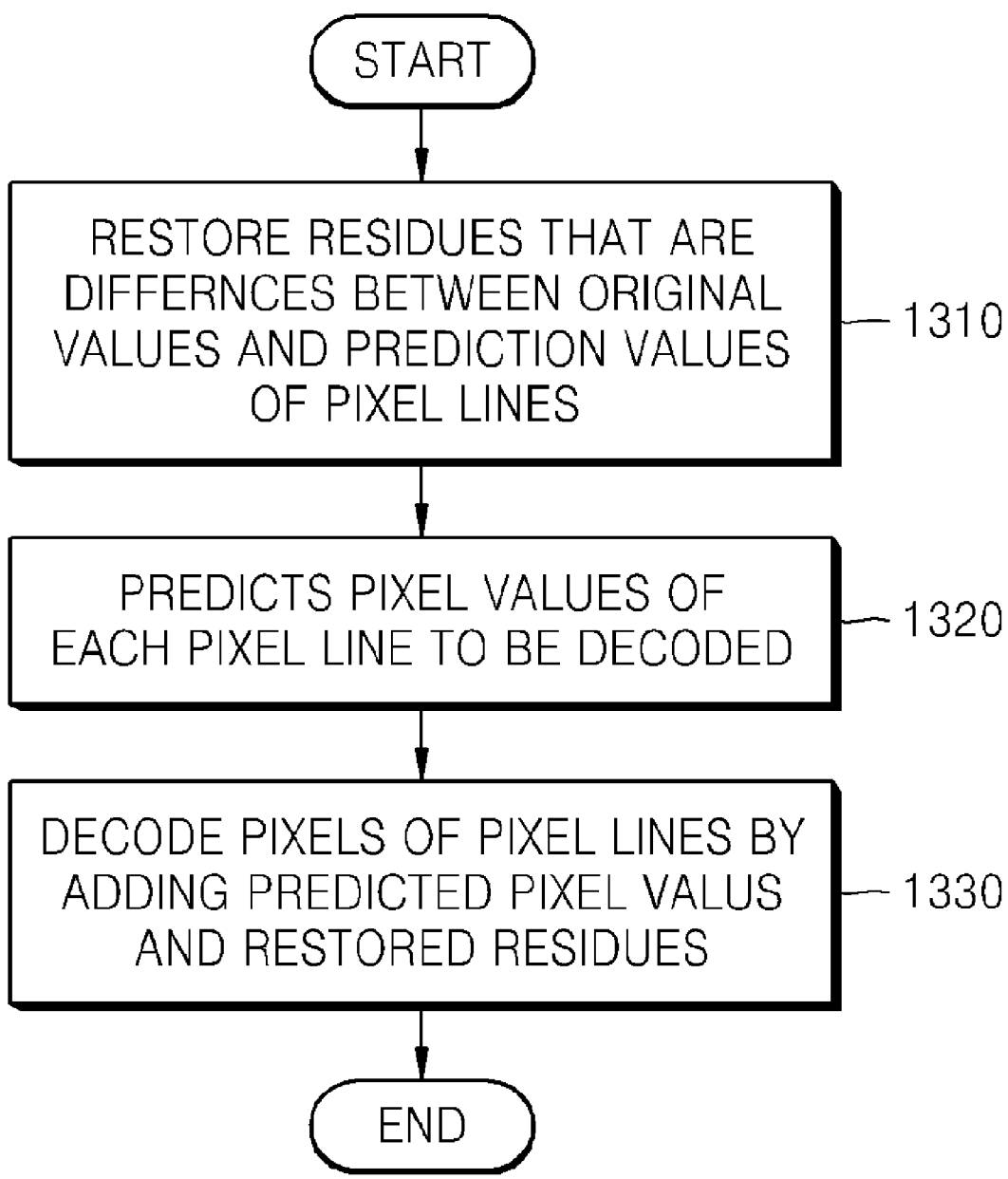
FIG. 13 is a flowchart illustrating a method of image decoding, according to another exemplary embodiment of the present invention.

FIG. 13 is a flowchart illustrating a method of image decoding, according to another exemplary embodiment of the present invention.

Referring to FIG. 13, in operation 1310, residues that are differences between prediction values and original values of horizontal or vertical pixel lines and that are included in a received bitstream, are restored.

In operation 1320, pixel values of each pixel line to be decoded are predicted by using pixel values of a previous pixel line decoded in a predetermined order.

In operation 1330, pixels of the current pixel lines are decoded by adding the predicted pixel values of the pixel lines and the restored residues.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to the exemplary embodiments of the present invention, if horizontal or vertical correlations exist between pixels in an input image block, prediction efficiency and compression efficiency may be improved by performing prediction and one-dimensional transformation in lines in consideration of the correlations.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of image encoding, the method comprising:
generating a first plurality of sub residual blocks by dividing a residual block, which has a predetermined size;
generating prediction sub residual blocks of the first plurality of the sub residual blocks by using residues of previously processed neighboring sub residual blocks;
generating difference sub residual blocks by calculating differences between the prediction sub residual blocks and the first plurality of sub residual blocks; and
transforming the difference sub residual blocks.

2. The method of claim 1, wherein, if a size of the residual block is N×N, where N is a positive number equal to or greater than 2, the generating of the first plurality of the sub residual blocks comprises dividing the residual block into the first plurality of the sub residual blocks which have a size of one of N×1, 1×N, and a×a, where a is a natural number smaller than N.

3. The method of claim 2, wherein the transforming of the difference sub residual blocks comprises performing a one-dimensional discrete cosine transformation (DCT) on the first plurality of the sub residual blocks which have a size of one of N×1 and 1×N.

4. The method of claim 1, wherein the generating of the prediction sub residual blocks is performed by using the residues of the previously processed neighboring sub residual blocks, which are restored by adding difference sub residual blocks of the previously processed neighboring sub residual blocks which are transformed, quantized, inverse quantized, and inverse transformed and prediction sub residual blocks of the previously processed neighboring sub residual blocks.

5. The method of claim 1, wherein the generating of the prediction sub residual blocks comprises predicting residues of a current sub residual block by extending residues of a previously processed neighboring sub residual block, of the previously processed neighboring sub residual blocks, at least in one of a horizontal and vertical direction in accordance with a division type of the first plurality of the sub residual blocks.

6. The method of claim 1, further comprising:
dividing the residual block into a second plurality of sub residual blocks, which have different sizes from the generated first plurality of the sub residual blocks;
generating prediction sub residual blocks of the second plurality of the sub residual blocks, which have the different sizes, by using the residues of the previously processed neighboring sub residual blocks;
generating difference sub residual blocks by calculating differences between the prediction sub residual blocks and the second plurality of the sub residual blocks, which have the different sizes; and
transforming the difference sub residual blocks of the second plurality of the sub residual blocks, which have the different sizes.

7. The method of claim 6, further comprising determining a division mode of the residual block by comparing costs of bitstreams generated by encoding the difference sub residual blocks of the second plurality of the sub residual blocks, which have the different sizes.

8. The method of claim 6, further comprising comparing the costs of bitstreams generated by encoding difference residual blocks of the second plurality of the sub residual blocks, which have the different sizes and costs of bitstreams generated by bypassing transformation of the residual block and quantizing and entropy encoding the residual block.

9. An apparatus for image encoding, the apparatus comprising:
a division unit which generates a first plurality of sub residual blocks by dividing a residual block which have a predetermined size;
a residue prediction unit which generates prediction sub residual blocks of the first plurality of sub residual blocks by using residues of previously processed neighboring sub residual blocks;
a subtraction unit which generates difference sub residual blocks by calculating differences between the prediction sub residual blocks and the first plurality of the sub residual blocks; and
a transformation unit which transforms the difference sub residual blocks.

10. The apparatus of claim 9, wherein, if a size of the residual block is N×N, where N is a positive number equal to or greater than 2, the division unit divides the residual block into the first plurality of the sub residual blocks, which have a size of one of N×1, 1×N, and a×a, where a is a natural number smaller than N.

11. The apparatus of claim 10, wherein the transformation unit performs a one-dimensional discrete cosine transformation (DCT) on the first plurality of the sub residual blocks, which have a size of one of N×1 and 1×N.

12. The apparatus of claim 9, wherein the residue prediction unit uses the residues of the previously processed neighboring sub residual blocks, which are restored by adding difference sub residual blocks of the previously processed neighboring sub residual blocks which are transformed, quantized, inverse quantized, and inverse transformed and prediction sub residual blocks of the previously processed neighboring sub residual blocks.

13. The apparatus of claim 9, wherein the residue prediction unit predicts residues of a current sub residual block by extending the residues of the previously processed neighboring sub residual block, of the previously processed neighboring sub residual blocks, at least in one of a horizontal and vertical direction in accordance with a division type of the first plurality of the sub residual blocks.

14. The apparatus of claim 9, further comprising a division mode determination unit which determines a division mode of the residual block by comparing costs of bitstreams generated by encoding the difference sub residual blocks of a second plurality of sub residual blocks, which have different sizes.

15. The apparatus of claim 14, wherein the division mode determination unit compares the costs of bitstreams generated by encoding difference residual blocks of the second plurality of sub residual blocks, which have the different sizes, and costs of bitstreams generated by bypassing transformation of the residual block and quantizing and entropy encoding the residual block.

16. A method of image decoding, the method comprising:
determining a division mode of a current residual block to be decoded by using information on a division mode of the residual block which is included in a received bitstream;
generating prediction sub residual blocks of a plurality of sub residual blocks of the residual block by using residues of previously decoded neighboring sub residual blocks in accordance with the determined division mode;
restoring difference residues that are differences between the prediction sub residual blocks and the plurality of the sub residual blocks and are included in the bitstream; and
restoring the plurality of the sub residual blocks by adding the prediction sub residual blocks and the difference residues.

17. The method of claim 16, wherein, if a size of the residual block is N×N, where N is a positive number equal to or greater than 2, the plurality of the sub residual blocks have a size of one of N×1, 1×N, and a×a, where a is a natural number smaller than N.

18. The method of claim 16, wherein the restoring of the difference sub residual blocks comprises performing entropy decoding, inverse quantization, and a one-dimensional inverse discrete cosine transformation (IDCT) on the plurality of the sub residual blocks having a size of one of N×1 and 1×N.

19. The method of claim 16, wherein the generating of the prediction sub residual blocks comprises predicting residues of a current sub residual block by extending residues of a previously restored neighboring sub residual block of the previously restored neighboring sub residual blocks, at least in one of a horizontal and vertical direction in accordance with the determined division mode of the plurality of the sub residual blocks.

20. An apparatus for image decoding, the apparatus comprising:
a residue prediction unit which generates prediction sub residual blocks of a plurality of sub residual blocks of a current residual block to be decoded by using residues of previously decoded neighboring sub residual blocks in accordance with a division mode of the residual block included in a received bitstream;
a difference residue restoration unit which restores difference residues that are differences between the prediction sub residual blocks and the plurality of the sub residual blocks and are included in the bitstream; and
an addition unit which restores the plurality of the sub residual blocks by adding the prediction sub residual blocks and the difference residues.

21. The apparatus of claim 20, wherein, if a size of the residual block is N×N, where N is a positive number equal to or greater than 2, the plurality of the sub residual blocks have a size of one of N×1, 1×N, and a×a, where a is a natural number smaller than N.

22. The apparatus of claim 20, wherein the difference residue restoration unit restores the difference residues by performing entropy decoding, inverse quantization, and a one-dimensional inverse discrete cosine transformation (IDCT) on the plurality of the sub residual blocks having a size of one of N×1 and 1×N.

23. The apparatus of claim 20, wherein the residue prediction unit predicts residues of a current sub residual block by extending residues of the previously restored neighboring sub residual block of the previously decoded neighboring sub residual blocks, at least in one of a horizontal and vertical direction in accordance with the determined division mode of the plurality of the sub residual blocks.

* * * * *